UNITED STATES PATENT OFFICE.

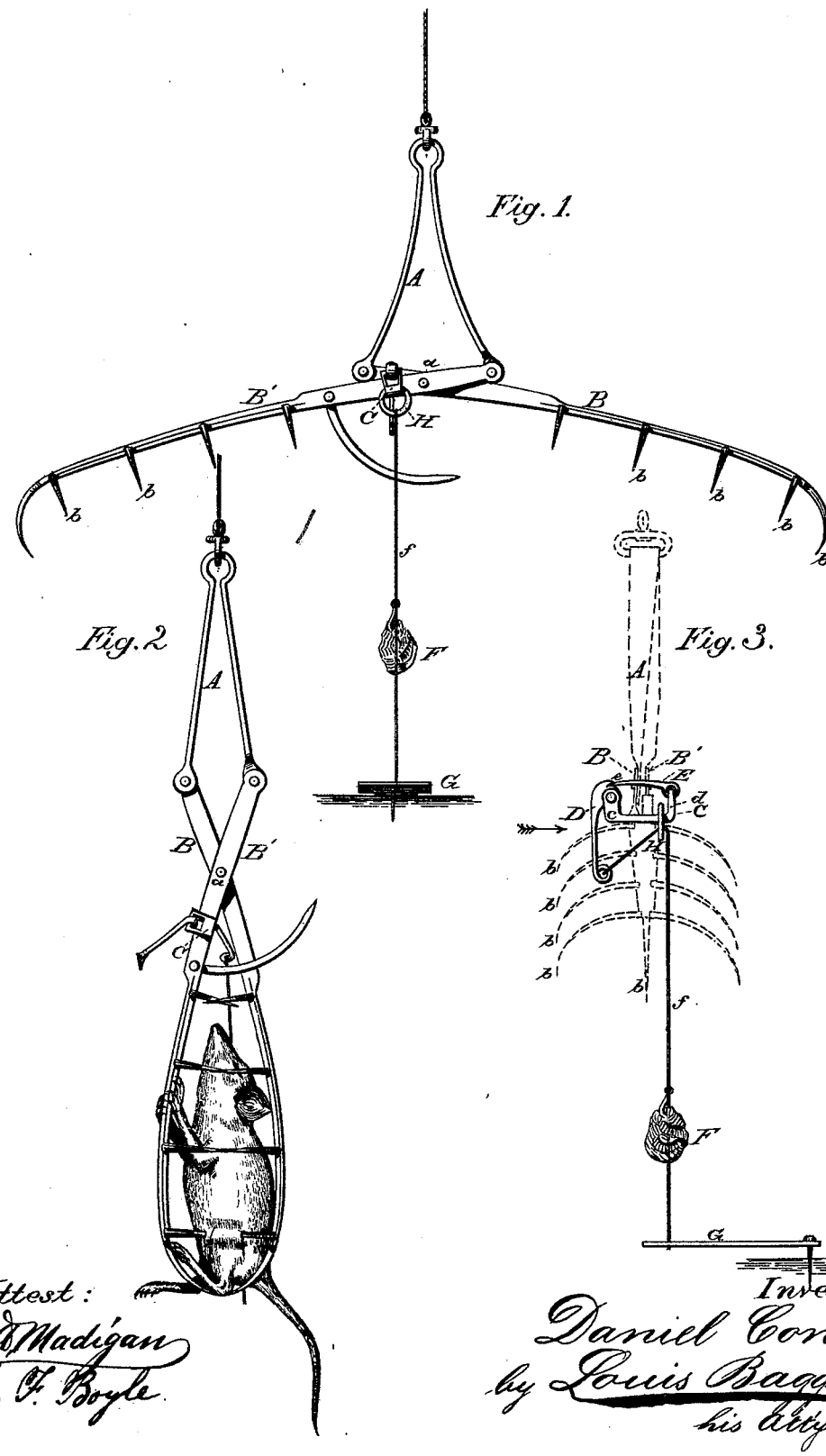

DANIEL CONNER, OF ATHENS, OHIO.

IMPROVEMENT IN ANIMAL-TRAPS.

Specification forming part of Letters Patent No. 182,897, dated October 3, 1876; application filed July 22, 1876.

*To all whom it may concern:*

Be it known that I, DANIEL CONNER, of Athens, in the county of Athens and State of Ohio, have invented certain new and useful Improvements in Animal-Traps; and I do hereby declare that the following is a full, clear, and exact description thereof, which will enable others skilled in the art to which it appertains to make and use the same, reference being had to the accompanying drawings, and to the letters of reference marked thereon, which form a part of this specification, and in which—

Figure 1 is a side elevation of the trap and appurtenances when set. Fig. 2 is a similar view of the trap when sprung, and Fig. 3 is a detailed view of the setting device.

Similar letters of reference indicate corresponding parts in all the figures.

This invention relates to that class of animal-traps that may be operated or sprung either by a bait or by a treadle; and it consists in the construction and combination of the parts thereof, as hereinafter more fully explained.

In the drawing, A represents a bent spring, having pivoted to its ends the arms B B'. These arms cross each other, and are pivoted together at $a$. They are furnished with curved prongs or claws $b$, and the arm B' has affixed to it a cross-piece, C, bent at right angles at $c$ and $d$, and having pivoted at $c$ the bent lever D, which has a notch, $e$. Pivoted at the other end $d$ is a pawl, E, which, when the trap is set, is fitted into the notch $e$, as shown in Fig. 3.

When the trap is set the arm B will be retained between the cross-piece C and the pawl E, the latter being kept in its position by the notched lever D. If the hold upon E is released by moving the lever D in the direction of the arrow the arms B B' will be forced together by the tension of the spring A, thereby grasping or catching between the prongs $b$ any object that is at the time in the proper position. To effect this springing of the trap I employ either a bait-hook, F, or a treadle, G, according to the nature of the animal for which the trap is to be set.

For burrowing-animals, such as moles, gophers, &c., I prefer to use the treadle; but for rats, &c., the bait-hook is preferable. In either case a cord or thin wire, $f$, is employed, one end of which is secured to the end of the arm D, the other end passing through a ring or guide, H, which is suspended upon the cross-piece C. If the bait-hook is used, this is secured, with the bait, to the end of the line $f$. If the treadle is used, the bait-hook is dispensed with, but the line $f$ is carried down to the treadle, to which it is affixed, as shown. In either case, by pulling the line $f$ the pawl E is released from D, and the pronged arms B B' will snap together, catching the animal between them.

The advantages of this trap are, first, simplicity of construction; second, durability, all the parts being made of iron or other metal, with the exception of the cord $f$, and even that may be of wire; third, absolute certainty of action; and, fourth, its adaptation for use in any place or locality, either in or out of doors. Besides, having once caught the animal, the construction of my improved trap is such as to prevent any possibility of escape.

Having thus described my invention, I claim and desire to secure by Letters Patent of the United States—

1. The combination of the spring A, arms B B', cross-piece C, bent lever D, and pawl E, all constructed and arranged substantially as and for the purpose hereinbefore set forth.

2. In combination with the retaining cross-piece C, pawl E, and bent lever D, the pull-cord $f$, terminating either at the bait-hook F or at the treadle G, substantially as and for the purpose hereinbefore set forth.

In testimony that I claim the foregoing as my own I have hereunto affixed my signature in the presence of two subscribing witnesses.

DANIEL CONNER.

Witnesses:
A. G. BROWN,
HENRY T. BROWN.